United States Patent
Anthony et al.

(10) Patent No.: US 11,308,565 B2
(45) Date of Patent: Apr. 19, 2022

(54) ONLINE JURY RESEARCH SYSTEM

(71) Applicants: Philip Anthony, Torrance, CA (US); Michael Cobo, Torrance, CA (US)

(72) Inventors: Philip Anthony, Torrance, CA (US); Michael Cobo, Torrance, CA (US)

(73) Assignee: DecisionQuest, Inc., Torrance, CA (US)

( * ) Notice: Subject to any disclaimer, the term of this patent is extended or adjusted under 35 U.S.C. 154(b) by 169 days.

(21) Appl. No.: 14/206,204

(22) Filed: Mar. 12, 2014

(65) Prior Publication Data

US 2014/0279536 A1  Sep. 18, 2014

Related U.S. Application Data

(60) Provisional application No. 61/782,523, filed on Mar. 14, 2013.

(51) Int. Cl.
 *G06Q 20/00* (2012.01)
 *G06Q 50/18* (2012.01)
 *G06Q 10/10* (2012.01)

(52) U.S. Cl.
 CPC .............. *G06Q 50/18* (2013.01); *G06Q 10/10* (2013.01)

(58) Field of Classification Search
 CPC ................................ G06Q 50/18; G06Q 10/10
 USPC ............................................................. 705/44
 See application file for complete search history.

(56) References Cited

U.S. PATENT DOCUMENTS

| | | | | |
|---|---|---|---|---|
| 2003/0018520 A1* | 1/2003 | Rosen | ............... | G06Q 30/02 705/12 |
| 2005/0187813 A1* | 8/2005 | Genevie | ............ | G06Q 50/18 705/7.31 |
| 2012/0246152 A1* | 9/2012 | Hughes | ............. | G06Q 30/02 707/722 |

OTHER PUBLICATIONS

Dialog NPL (non-patent literature) Search Report, dated Dec. 3, 2021 (Year: 2021).*
Google Scholar NPL Search, dated Dec. 3, 2021 (Year: 2021).*

* cited by examiner

*Primary Examiner* — Hai Tran
(74) *Attorney, Agent, or Firm* — Rutan & Tucker LLP; Hani Z. Sayed

(57) ABSTRACT

An apparatus and a method are provided for an online jury research system which enables a multiplicity of end-users to build surrogate jury surveys by way of a communications network, such as the Internet. The online jury research system comprises a survey builder which enables the end-users to upload information for which responses of surrogate jurors are desired and to assemble surrogate jury surveys. The uploaded information may include questions, video-taped opening or closing statements, depositions, exhibits, and graphics. A host site is accessible to the end-users by way of the communications network and provides access to a jury services package. In an embodiment, the survey services package comprises services operated by one or more third-party service providers. The online jury research system provides the surrogate jury survey to selected respondents and then compiles the results for review by the end-users.

19 Claims, 4 Drawing Sheets

┌─ 248  ┌─ 244                               ┌─ 240
Would you acquit the defendant based on the evidence presented in the previous question?

○ Yes    ○ No

Did you like my opening statement?

○ Yes    ○ No
     └─ 248   └─ 244

FIG. 2D

┌─ 256                           ┌─ 252
If you are arrested by the police, you must be guilty:

○ Strongly Agree
○ Somewhat Agree
○ Somewhat Disagree
○ Strongly Disagree
○ Neither Agree nor Disagree

ONLINE JURY RESEARCH SYSTEM

RELATED APPLICATIONS

This application claims the benefit of and priority to U.S. Provisional Application, entitled "Online Jury Research System," filed on Mar. 14, 2013 having application Ser. No. 61/782,523.

FIELD

The field of the present invention generally relates to online survey systems. More particularly, the field of the invention relates to an apparatus and a method for an online jury research system.

BACKGROUND

A jury consultant generally works in cooperation with a lawyer during jury selection, during trial, and may make comments post trial. The jury consultant may review the lawyer's effectiveness with a jury, and thus assist the lawyer with becoming more effective with future juries. During the jury selection process, the jury consultant observes the responses of potential jurors and may influence the lawyer's decisions about which potential jurors are most likely to return a desired verdict. Further, the jury consultant may help the lawyer prepare questions for the potential jurors.

During the voir dire process, where potential jurors are informed about the case and questioned as to any feelings they may have which may cause undue prejudice, the jury consultant attempts to discern the legitimacy of each potential juror's responses. The jury consultant often must rely upon indirect evidence, such as body language, such as shifting in one's seat, or facial expressions, in an attempt to assist the attorney in selecting the best possible jury. Generally, the jury consultant will continue to observe the chosen jurors during the trial so as to discern how effectively the attorney is conveying his or her view of the case. The jury consultant may note when jurors seem emotional due to testimony, or seem unaffected by testimony. Further, the jury consultant may look for any indication among the jurors that might lead to a hung jury causing a mistrial.

After a verdict or decision is rendered, the jury consultant may review the case with the lawyer to assist the lawyer with improving performance in future trials. For instance, the jury consultant may suggest changes in closing statements that will have the greatest impact on the jurors. Moreover, after all testimony and statements have been presented, the jury consultant often will propose a likely decision to the lawyer about whether the case will be won or lost.

As will be appreciated by those skilled in the art, the field of jury consulting is not an exact science as people are, by nature, unpredictable. Reading people, reading testimony, and anticipating decisions are inherently imprecise, especially since there is no opportunity for the jury consultant to directly interact with jurors. One problem with the jury consulting approach to gathering information for case preparation is that the attorney must rely on information from previous cases before applying the information to future cases. What is needed, therefore, is an apparatus and a method for revealing which arguments, themes, strategies, evidence, and presentations will be most persuasive to potential jurors in future cases.

SUMMARY OF THE INVENTION

An apparatus and a method are provided for an online jury research system which enables a multiplicity of end-users to build surrogate jury surveys by way of a communications network, such as the Internet. The online jury research system comprises a survey services package including a survey builder configured to enable the multiplicity of end-users to build surrogate jury surveys. The survey builder generally operates as a gateway enabling the end-users to upload information for which responses of surrogate jurors are desired and to assemble surrogate jury surveys. In an embodiment, end-users may upload questions, videotaped opening statements, depositions, exhibits, graphics, and other similar information for review by surrogate jurors. A host site is stored on a non-transient machine-readable medium of a jury research server system, accessible to the multiplicity of end-users by way of the communications network. The host site is configured to provide the end-users access to the jury research system by way of an interface. In one embodiment, the survey services package is stored on the jury research server system, and the interface is a software application comprising a portion of the jury research system which provides access to the survey services package. In another embodiment, the survey services package comprises services operated by one or more third-party service providers, and the interface comprises a connection over the communications network whereby the jury research server system may send requests to, and receive services from the one or more third-party service providers. A database server system comprises a non-transient machine-readable medium for storing data needed during the operation of the jury research system. The online jury research system provides the surrogate jury survey to a multiplicity of selected survey respondents and then compiles the results of the survey for review by the end-users.

In an exemplary embodiment, an apparatus for an online jury research system which enables a multiplicity of end-users to build surrogate jury surveys comprises a jury research system comprising a survey services package including a survey builder configured to enable the multiplicity of end-users to build surrogate jury surveys; a host site accessible to the multiplicity of end-users by way of a communications network, where the host site is stored on a non-transient machine-readable medium of a jury research server system and configured to provide the multiplicity of end-users access to the jury research system by way of an interface; and a database server system comprising a non-transient machine-readable medium for storing data needed during the operation of the jury research system; wherein the online jury research system provides the surrogate juror survey to a multiplicity of selected survey respondents and then compiles the results of the survey for review by the end-users.

In another exemplary embodiment, the survey services package is stored on the memory of the jury research server system, and the interface is a software application comprising a portion of the jury research system. In another exemplary embodiment, the survey services package is stored on the memory of the database server system, and the interface enables interaction between the jury research server system and the survey services package. In another exemplary embodiment, the survey services package comprises services operated by one or more third-party service providers. In another exemplary embodiment, the interface comprises a connection over the communications network whereby the jury research server system may send requests to, and receive services from the one or more third-party service providers.

In another exemplary embodiment, the survey services package comprises a payment authorization service which enables the end-users to send payment to an operator of the online jury research system for services rendered. In another exemplary embodiment, the payment authorization service is a third-party service which provides a payment gateway to the multiplicity of end-users. In another exemplary embodiment, the survey builder operates as a gateway enabling the end-users to upload information for which responses of surrogate jurors are desired and to assemble surrogate jury surveys. In another exemplary embodiment, the information comprises questions, videotaped opening or closing statements, depositions, exhibits, graphics, and other similar information uploaded for review by the surrogate jurors.

In another exemplary embodiment, the survey builder comprises at least one software application stored on the jury research server system, whereby the end-users interact with the survey builder by way of the host site. In another exemplary embodiment, the survey builder comprises a third-party service provider which assists the end-users with building and tailoring surrogate jury surveys by way of the interface. In another exemplary embodiment, the third-party service provider sends completed surrogate juror surveys to the jury research server system by way of the interface. In another exemplary embodiment, the third-party service provider makes the surrogate juror survey accessible to the multiplicity of selected respondents and then sends final results of the surrogate juror survey to the jury research server system by way of the interface.

In another exemplary embodiment, the survey services package includes a respondents pool comprising a multiplicity of suitable surrogate jurors that are selected for providing answers to questions posed in surrogate jury surveys. In another exemplary embodiment, the survey builder has access to the respondents pool so as to enable the end-users to select appropriate respondents for surrogate jury surveys. In another exemplary embodiment, the respondents pool is stored on the database server system and is accessible to the survey builder by way of the interface. In another exemplary embodiment, the respondents pool is provided and moderated by a third-party service provider which specializes in gathering panels of respondents that are suitable for surrogate jury surveys.

In another exemplary embodiment, the survey services package includes a questions pool comprising a group of compelling questions that are tested and well known to elicit concise responses from surrogate jurors. In another exemplary embodiment, the questions pool is accessible to the survey builder, thereby enabling the end-users to select questions that are best suited to the type of surrogate jury survey being created. In another exemplary embodiment, the end-user may create new questions in addition to, or in place of selecting questions from the question pool. In another exemplary embodiment, the questions pool is stored on the database server system, and is accessible to the survey builder by way of the interface. In another exemplary embodiment, the survey builder comprises a third-party service provider which has access to the questions pool that is stored on the database server system, and any questions created by the end-user, by way of the interface. In another exemplary embodiment, the questions pool is stored with the survey builder and then transferred to the database server system by way of the interface after the surrogate jury survey is completed in the survey builder. In another exemplary embodiment, the questions pool is retained by the survey builder and only final results of the surrogate jury survey are transferred to the jury research server system once the survey has been completed.

In an exemplary embodiment, a method for providing an online jury research system which enables a multiplicity of end-users to build surrogate jury surveys comprises configuring a jury research system to enable the multiplicity of end-users to build surrogate jury surveys; configuring a host site to provide the multiplicity of end-users with access to the jury research system by way of an interface; storing the host site on a non-transient machine-readable medium of a jury research server system such that the jury research system is accessible to the multiplicity of end-users by way of a communications network; configuring a non-transient machine-readable medium of a database server system to store data needed during the operation of the jury research system; providing the surrogate juror survey to a multiplicity of selected survey respondents; and compiling results of the survey for review by the multiplicity of end-users.

In another exemplary embodiment, configuring the jury research system further comprises providing a survey services package stored on the jury research server system. In another exemplary embodiment, the method for providing the online jury research system further comprising configuring the interface as a software application stored on the jury research system to provide access to the survey services package by the multiplicity of end-users. In another exemplary embodiment, providing the survey services package further comprises configuring a payment authorization service to enable the multiplicity of end-users to send payments to an operator of the online jury research system for services rendered. In another exemplary embodiment, providing the survey services package further comprises configuring a survey builder to operate as a gateway which enables the multiplicity of end-users to assemble surrogate jury surveys and to upload information for which responses of surrogate jurors are desired. In another exemplary embodiment, providing the survey services package further comprises establishing a respondents pool comprising a multiplicity of surrogate jurors that are suitable for providing answers to surrogate jury surveys. In another exemplary embodiment, providing the survey services package further comprises establishing a questions pool comprising a group of compelling questions that are suitable for eliciting concise responses from surrogate jurors.

In another exemplary embodiment, configuring the jury research system further comprises providing a survey services package comprising services operated by one or more third-party service providers. In another exemplary embodiment, the interface comprises one or more connections over the communications network whereby the jury research server system may send requests to, and receive services from the one or more third-party service providers.

BRIEF DESCRIPTION OF THE DRAWINGS

The drawings refer to embodiments of the present invention in which:

FIG. 2D illustrates an exemplary embodiment of a Yes/No question, according to the present invention;

FIG. 2E illustrates an exemplary embodiment of a scale-response question in accordance with the present invention.

Figure 1:
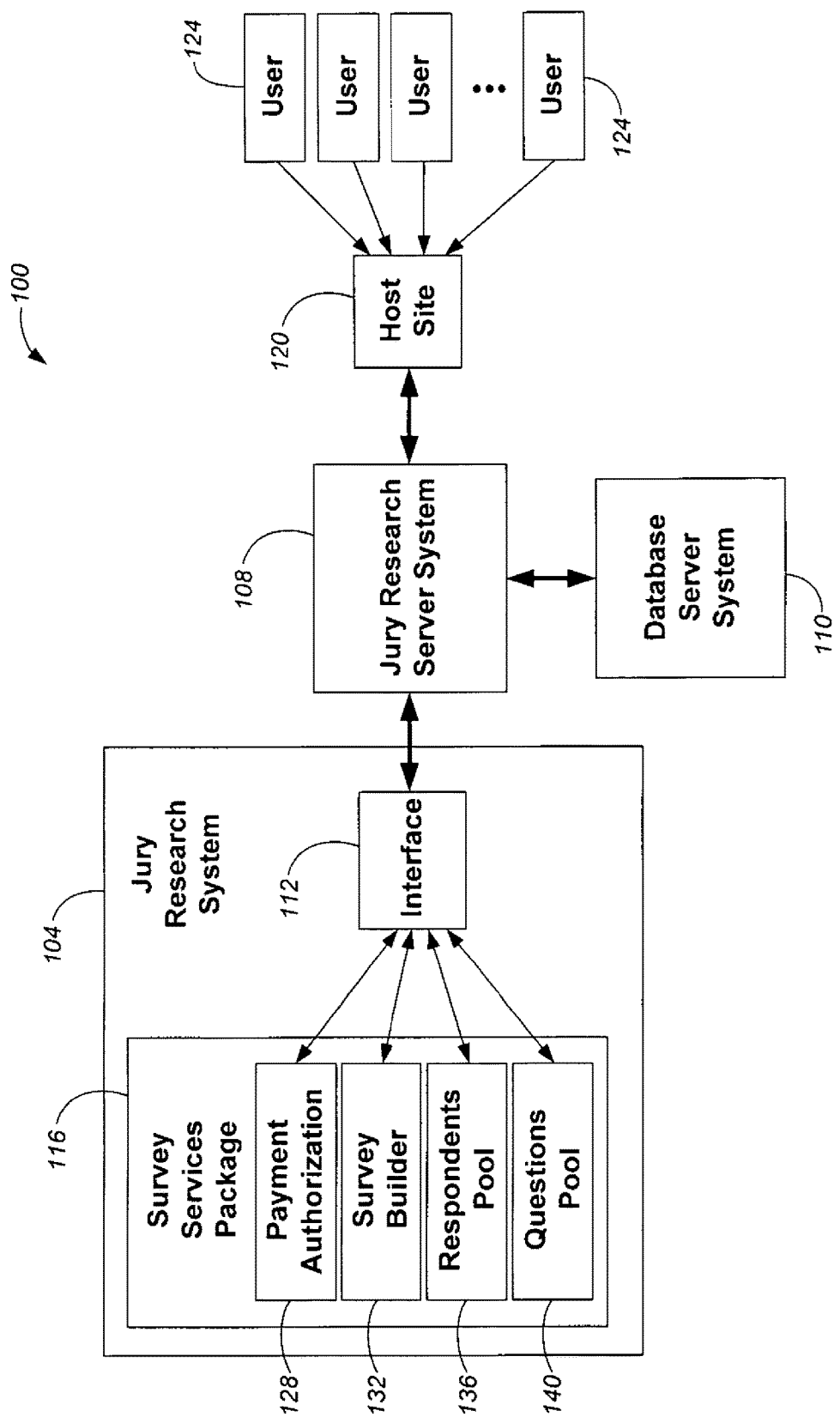
FIG. 1 is a schematic illustrating an exemplary embodiment of an online jury research system in accordance with the present invention.

While the present invention is subject to various modifications and alternative forms, specific embodiments thereof have been shown by way of example in the drawings and will herein be described in detail. The invention should be understood to not be limited to the particular forms disclosed, but on the contrary, the intention is to cover all modifications, equivalents, and alternatives falling within the spirit and scope of the present invention.

DETAILED DISCUSSION

In the following description, numerous specific details are set forth in order to provide a thorough understanding of the present invention. It will be apparent, however, to one of ordinary skill in the art that the present invention may be practiced without these specific details. In other instances, well known components or methods have not been described in detail but rather in a block diagram, or a schematic, in order to avoid unnecessarily obscuring the present invention. Further specific numeric references such as "first driver," may be made. However, the specific numeric reference should not be interpreted as a literal sequential order but rather interpreted that the "first driver" is different than a "second driver." Thus, the specific details set forth are merely exemplary. The specific details may be varied from and still be contemplated to be within the spirit and scope of the present invention. The term "coupled" is defined as meaning connected either directly to the component or indirectly to the component through another component.

In general, the present invention describes an apparatus and a method for an online jury research system which enables a multiplicity of end-users to build surrogate jury surveys by way of a communications network, such as the Internet. The online jury research system comprises a survey builder which enables the end-users to upload information for which responses of surrogate jurors are desired and to assemble surrogate jury surveys. The uploaded information may include questions, videotaped opening statements, depositions, exhibits, graphics, and other similar information. A host site is accessible to the end-users by way of the communications network and provides access to a jury services package. In an embodiment, the survey services package comprises services operated by one or more third-party service providers. The online jury research system provides the surrogate jury survey to selected survey respondents and then compiles the results for review by the end-users.

FIG. 1 is a schematic illustrating an exemplary embodiment of an online jury research system 100 in accordance with the present invention. The online jury research system 100 comprises a jury research system 104 stored on a non-transient machine-readable medium (i.e., a memory) of a jury research server system 108. The online jury research system 100 further comprises a database server system 110 which stores any data that may be needed during the operation of the jury research system 104. In an embodiment, the database server system 110 comprises a wide variety of compelling questions designed to elicit concise responses from surrogate jurors. The compelling questions are stored on a non-transitory machine readable-medium of the database server system 110, and the questions are directly accessible by the jury research system 104. It is envisioned that the questions are tested and tailored to a large variety of case types, including but not necessarily limited to personal interviews, focus groups, mock trials, and juror attitude studies. It is further envisioned that the database server system 110 may also store questions created by the end-users of the online jury research system 100.

The jury research system 104 further comprises an interface 112 which provides access to a survey services package 116. As illustrated in FIG. 1, a host site 120 provides a multiplicity of end-users 124 access to the jury research server system 108 by way of a communications network, such as the Internet. Preferably, each of the end-users 124 creates a specific surrogate jury survey by utilizing applications stored on the memory of the jury research server system 108 and the services provided by the jury research system 104. In one embodiment, the survey services package 116 is stored on the memory of the jury research server system 108, and the interface 112 is a software application which comprises a portion of the jury research system 104, thereby providing access to the survey services package 116. In another embodiment, the survey services package 116 is stored on the memory of the database server system 110, and the interface 112 enables interaction between the jury research server system 108 and the survey services package 116 on the database server system 110. In another embodiment, the survey services package 116 may be services operated by one or more third-party service providers. In this embodiment, the interface 112 may comprise a connection over the communications network, such as an Internet connection, whereby the jury research server system 108 may send requests to, and receive services from the one or more third-party service providers.

In the embodiment illustrated in FIG. 1, the survey services package 116 comprises services that are provided to the end-users 124, including, but not necessarily limited to a payment authorization 128, a survey builder 132, a respondents pool 136, and a questions pool 140. The payment authorization 128 provides a secure infrastructure to enable the end-users 124 to send payment to operators of the online jury research system 100 for services rendered. In another embodiment, the payment authorization 128 may be a third-party service which provides a payment gateway offering an infrastructure and security to ensure fast, reliable and secure transmission of funds. Once each of the end-users 124 uploads a predetermined fee, the third-party service may send a notification to the jury research server system 108, which then allows the end-user 124 to proceed with building a surrogate jury survey.

The survey builder 132 operates as a gateway which enables the end-users 124 to assemble their surrogate jury surveys. In one embodiment, the survey builder 132 comprises at least one software application stored on the jury research server system 108, whereby the end-users 124 interact with the survey builder 132 by way of the host site 120. In another embodiment, the survey builder 132 comprises a third-party service provider which offers an infrastructure and various online tools to assist the end-users 124 with building and tailoring their surrogate jury surveys by way of the interface 112. Generally, the survey builder 132 enables the end-users 124 to upload information for which responses of surrogate jurors are desired. The information may include, but is not necessarily limited to, questions, videotaped opening or closing statements, depositions, exhibits, graphics, and other similar information uploaded for review by the surrogate jurors. Once the end-user 124 completes building a surrogate jury survey, the completed survey may then be sent by the third-party service provider to the jury research server system 108 by way of the interface 112. The jury research server system 108 may provide the survey to a multiplicity of selected survey respondents and then compile the results of the survey for review by the end-user 124. In another embodiment, the third-party service provider may further operate the surrogate jury survey created by the end-user 124 by making the survey available to the multiplicity of selected respondents and then send the results of the survey to the jury research server system 108 by way of the interface 112. The jury research server system 108 may then compile the results of the survey for review by the end-user 124.

It will be appreciated that the survey builder 132 requires access to the respondents pool 136 and the questions pool 140 so as to enable the end-users 124 to select appropriate respondents and desired questions for their surrogate jury surveys. The respondents pool 136 comprises a multiplicity of suitable surrogate jurors that are selected for providing answers to questions posed in surrogate jury surveys. In one embodiment, the respondents pool 136 is stored on the database server system 110 and is accessible to the survey builder 132 by way of the interface 112. In another embodiment, the respondents pool 136 is provided and moderated by a third-party service provider which specializes in gathering panels of respondents that are suitable for surrogate jury surveys. It is envisioned that the third-party service provider ensures that responses are authentic, well-intentioned and unique to eliminate duplicate responses or skewed results, as well as removing unresponsive, suspicious or otherwise low-quality panelists from the respondents pool 136.

The questions pool 140 comprises a group of compelling questions that are tested and well known to elicit concise responses from surrogate jurors. The questions pool 140 is accessible to the survey builder 132, thereby enabling each end-user 124 to select certain questions that are best suited to the particular surrogate jury survey being created. In an embodiment, the end-user 124 may write new questions in addition to, or in place of, selecting questions from the question pool 140. In one embodiment, the questions pool 140 is stored on the database server system 110, and is accessible to the survey builder 132 by way of the interface 112. In another embodiment, where the survey builder 132 comprises a third-party service provider, the questions pool 140, and any questions created by the end-user 124, may be stored on the database server system 110 and made available to the survey builder 132 by way of the interface 112 in the form of a connection over the communications network, such as the Internet. In still another embodiment, the questions pool 140 may be stored with the survey builder 132 at the site of the third-party service provider. Once the surrogate jury survey has been completed in the survey builder 132, the surrogate jury survey and all those certain questions utilized in the survey may be transferred to the database server system 110 by way of the interface 112. In yet another embodiment, the survey builder 132 and the questions pool 140 may be stored at the site of the third-party service provider, where only the final results of the surrogate jury survey are transferred to the jury research server system 108 once the survey has been answered by the surrogate jurors. It will be appreciated by those skilled in the art that a wide variety of relationships may be established between the servers 108, 110 and the services comprising the survey services package 116 without detracting from the spirit and scope of the present invention.

Figure 2A:
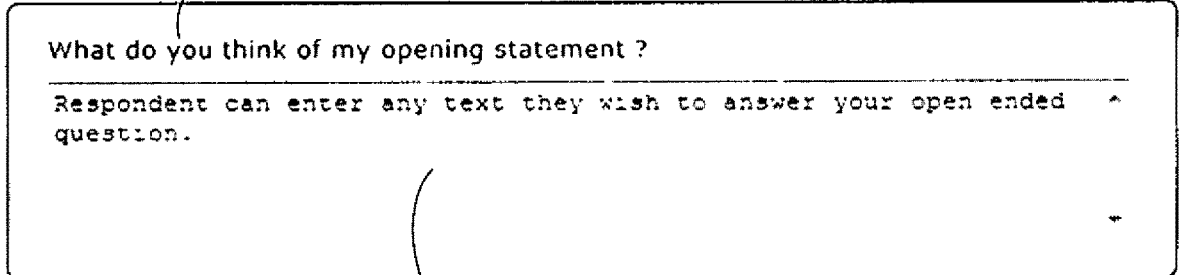
FIG. 2A illustrates an exemplary embodiment of an open-ended question, according to the present invention.

Those skilled in the art will recognize that a various types of questions, having different formats, are necessary to ascertain likely juror reactions with which the end-users 124 may be concerned. Preferably, the questions pool 140 provides questions in various predefined formats that are available to the end-users 124 building their surrogate jury surveys. FIG. 2A illustrates an exemplary embodiment of an open-ended question box 204, according to the present invention. The open-ended question box 204 comprises a specific question 208 which the end-user 124 wishes to pose to the surrogate juror and a textbox 212 wherein the surrogate juror may enter a textual response. It will be appreciated that the open-ended question box 204 is particularly useful for obtaining the opinions of the surrogate jurors.

Figure 2B:
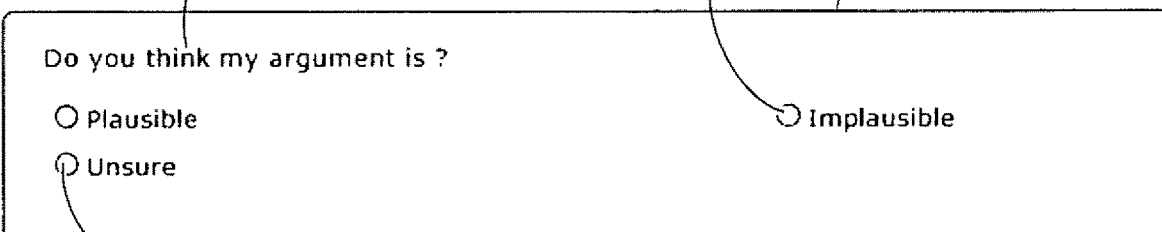
FIG. 2B illustrates an exemplary embodiment of a single-response question in accordance with the present invention.

FIG. 2B illustrates an exemplary embodiment of a single-response question box 216 in accordance with the present invention. The single-response question box 216 comprises a question 220 and two or more answer boxes 224. The two or more answer boxes 224 comprise specific answers with which the end-user 124 is particularly interested. The single-response question box 216 allows the surrogate juror to select only one of the two or more answer boxes 224. The surrogate juror may select an appropriate answer to the question 220 by clicking on one of the answer boxes 224 with a pointing device, such as a mouse or stylus. In one embodiment, the question 220 and the answers used for the answer boxes 224 are drawn from the questions pool 140, and thus are tested and well known to elicit concise responses from surrogate jurors. In another embodiment, the question 220 and the answers used for the answer boxes 224 are created by the end-user 124 during creation of the surrogate jury survey. It will be appreciated that the single-question question box 216 is particularly well suited for focusing surrogate juror responses so as to avoid superfluous answers to specific questions.

Figure 2C:
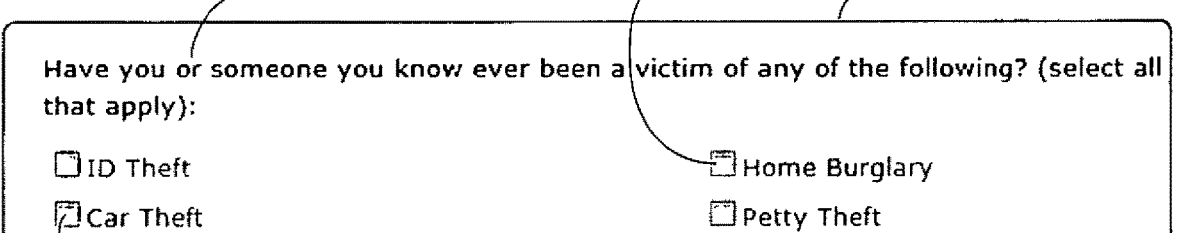
FIG. 2C illustrates an exemplary embodiment of a multiple-response question in accordance with the present invention.

FIG. 2C illustrates an exemplary embodiment of a multiple-response question box 228 in accordance with the present invention. The multiple-response question box 228 comprises a specific question 232 and two or more answer check boxes 236. The multiple-response box 228 is substantially similar to the single-response question box 216, with the exception that the multiple-response question box enables the surrogate juror to select any number of the two or more answer check boxes 236, as needed. As with the single-response question box 216, the question 232 and the answers used for the answer check boxes 236 may be either drawn from the questions pool 140 or created by the end-user 124 during creation of the surrogate jury survey. It will be recognized by those skilled in the art that the multiple-response question box 228 is suitable for assessing surrogate juror preferences or reactions to the specific question 232, and may be used to gather additional background information from surrogate jurors.

FIG. 2D illustrates an exemplary embodiment of a Yes/No question box 240, according to the present invention. The Yes/No question box 240 comprises one or more specific questions 244, each of which followed by a Yes and a No answer boxes 248. As with the question boxes illustrated in FIGS. 2A-2C, the one or more specific questions 244 may be drawn from the questions pool 140, or created by the end-user 124 during creation of the surrogate jury survey. Further, the surrogate juror may select either a Yes answer or a No answer pertaining to one specific question 244. In no instance may the user select both the Yes/No answer boxes 248 pertaining to one specific question 244. It will be appreciated that the Yes/No question box 240 enables the end-user 124 to elicit absolute answers to specific questions without surrogate jurors providing superfluous information.

FIG. 2E illustrates an exemplary embodiment of a scale-response question box 252 in accordance with the present invention. The scale-response question box 252 comprises a specific question 256 and a multiplicity of answer selections 260. The scale-response question box 252 is substantially similar to the single-response question box 216 insofar that the scale-response question box 252 allows the surrogate juror to select only one of the answer selections 260. Unlike the single-response question box 216, however, the answer selections 260 preferably are more closely related to one another so as to establish an extent to which the surrogate juror agrees or disagrees with the question 256.

Figure 3:
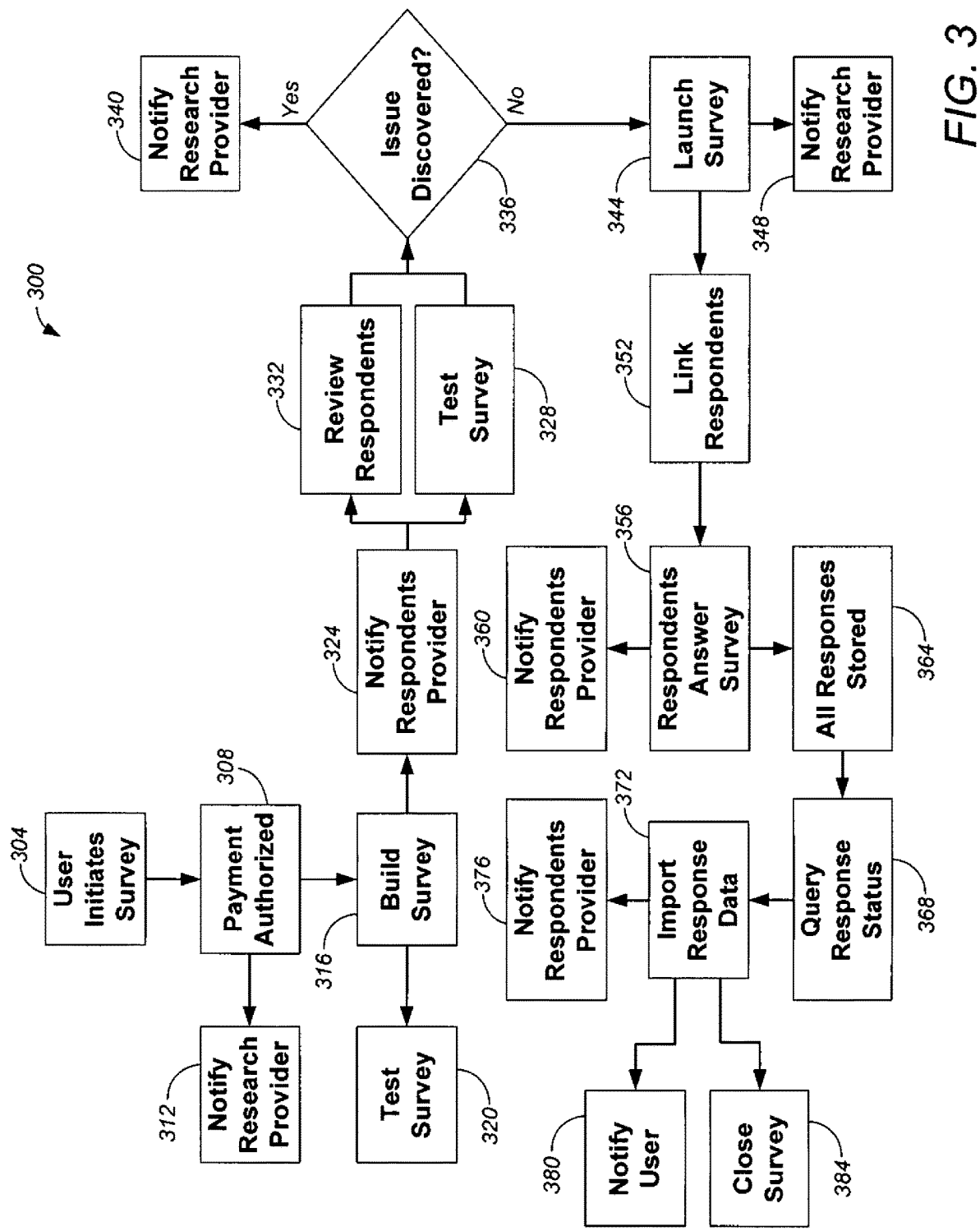
FIG. 3 is a schematic illustrating an exemplary embodiment of an online jury research method, according to the present invention.

FIG. 3 is a schematic illustrating an exemplary embodiment of an online jury research method 300, according to the present invention. The online jury research method 300 begins at an initiation step 304 where the end-user 124 initiates a new surrogate jury survey. As discussed in connection with FIG. 1, the end-users 124 access the jury research server system 108 by way of the host site 120, whereby each of the end-users 124 may create a specific surrogate jury survey by utilizing applications stored on the memory of the jury research server system 108. It is envisioned that in one embodiment initiating a new surrogate jury survey comprises at least "signing up" to receive research services from a research provider which operates the online jury research system 100 and agreeing to pay for services rendered. In another embodiment, where various different levels of jury research are offered, the end-user 124 may further select a specific "research package" during the initiation step 304. It will be appreciated that various degrees of research services may be offered to the end-users 124 and a wide variety of methods for signing up the end-users 124 may be used without detracting from the present invention.

Once the end-user 124 has initiated the new surrogate jury survey, the online jury research method 300 proceeds to a payment authorization step 308 where the end-user 124 may securely upload funds to pay for the research services selected in the initiation step 304. In one embodiment, the payment authorization step 308 is operated by the jury research server system 108 and the end-user's payment details are stored in the database server system 110. In another embodiment, the payment authorization step 308 may be operated by a third-party service which provides a payment gateway offering an infrastructure and security to ensure fast, reliable and secure transmission of funds. Once the end-user 124 uploads the required payment, a notification 312 is sent to the research provider, indicating that the end-user 124 has successfully paid for the selected research services. The online jury research method 300 then allows the end-user 124 to build the new surrogate jury survey at a build survey step 316. Where a third-party service operates the payment authorization step 308, the third-party service sends the notification 312 to the research provider, which then allows the end-user 124 to proceed to the build survey step 316.

The build survey step 316 preferably operates as a gateway which enables the end-user 124 to assemble the surrogate jury survey and upload information for which responses of surrogate jurors are desired. In one embodiment, the build survey step 316 comprises interaction between the end-user 124 and at least one software application stored on the jury research server system 108 so as to enable the end-user 124 to select appropriate respondents and desired questions for the surrogate jury survey. In another embodiment, the build survey step 316 may be operated by a third-party service provider which offers an infrastructure and various online tools to assist the end-user 124 with building the surrogate jury survey.

As discussed with reference to FIG. 1, the respondents pool 136 and the questions pool 140 may be stored and maintained by the online jury research system 100. In the illustrated embodiment of FIG. 3, however, the respondents pool 136 is provided and moderated by a third-party respondents provider which specializes in gathering panels of respondents that are suitable for responding to surrogate jury surveys. Once the surrogate jury survey is completed to the satisfaction of the end-user 124, the online jury research method 300 advances to a test survey step 320 and a notification 324 that the survey is completed is sent to the respondents provider. The test survey step 320 enables the end-user 124 to test-run the surrogate jury survey. Upon receiving the notification 324, the respondents provider will test-run the surrogate jury survey at a test survey step 328 and begin a process of reviewing the panel of respondents selected for the surrogate jury survey at a review respondents step 332. It is envisioned that during the steps 328, 332 the respondents provider reviews the surrogate jury survey, as well as removing unresponsive, suspicious or otherwise low-quality panelists from the pool of respondents selected for the surrogate jury survey.

At a discovery step 336, the respondents provider determines whether or not any issues, or problems, exist with the surrogate jury survey and the selected panel of respondents. If one or more issues are discovered, the respondents provider sends a notification 340 to the research provider and then awaits further instructions. If there are no issues discovered at step 336, then the online jury research method 300 proceeds to a launch survey step 344. Once the surrogate jury survey launches, a notification 348 of the launch is sent to the research provider and each of the selected respondents is sent a link to the surrogate jury survey at a linking step 352. Preferably, the respondents answer the survey questions while residing in the privacy of their own residences or offices, and thus use the link to access a web site where the surrogate jury survey is made available. In another embodiment, the respondents may reside at a location other than their own residences or offices, such as a secure testing site or other similar location which is dedicated to ensuring that responses are authentic, well-intentioned and unique so as to minimize, or eliminate, duplicate responses or skewed survey results.

Once the respondents use the provided link to access the surrogate jury survey, the online jury research method 300 advances to an answer survey step 356 where the respondents provide answers to the survey questions. In an embodiment, the questions provided to the respondents may take the form of the exemplary question boxes illustrated in FIGS. 2A-2E. In another embodiment, the exemplary questions boxes illustrated in FIGS. 2A-2E may be directed to videotaped opening or closing statements, depositions, exhibits, graphics, and the like. If any problems are detected with respect to the respondents or their answers to the questions, a notification 360 is sent to the respondents provider. The notification 360 enables the respondents provider to replace, for example, disqualified or unresponsive surrogate jurors, thereby ensuring that the surrogate jury survey is responded to by the agreed upon number of surrogate jurors comprising the juror panel. Further, the notification 360 is used to inform the respondents provider when the surrogate jurors successfully complete the surrogate juror survey as expected. In one embodiment, the notification 360 may be sent to the respondents provider on a per-juror basis, thereby informing the respondents provider about the performance of each juror participating in the surrogate juror survey. In another embodiment, the notification 360 may be sent to the respondent provider on a per-survey basis, thereby informing the respondents provider about the performance of the entire panel of jurors participating in the surrogate jury survey. In still another embodiment, the notification 360 may be send to the respondents provider only when problems are detected with respect to the respondents or their answers to the questions.

Once all the of the surrogate jurors have answered all of the questions comprising the surrogate jury survey, all the answers are compiled and stored in a compilation step 364. The online jury research method 300 then advances to a query step 368 where each juror response stored during the compilation step 364 is queried for completeness. In the illustrated embodiment of FIG. 3, the respondents provider performs the query step 368 and then exports complete juror responses to the jury research server system 108 by way of the interface 112 in an import step 372. In another embodiment, the jury research server system 108 may perform the query step 368 and then import complete juror responses in the import step 372.

Once the number of imported complete juror responses equals the agreed upon number of surrogate jurors comprising the juror panel, a notification 376 is sent to the respondents provider, indicating that the surrogate juror survey is finished. A notification 380 is sent to the end-user 124, indicating that the final results of the surrogate juror survey are available for review. The online jury research method 300 concludes at a close survey step 384 where the surrogate juror survey is taken offline and closed.

In one embodiment, the software used to facilitate the algorithms discussed herein can be embodied onto a non-transitory machine-readable medium. A machine-readable medium includes any mechanism that stores information in a form readable by a machine (e.g., a computer). For example, a machine-readable medium includes read only memory (ROM); random access memory (RAM); magnetic disk storage media; optical storage media; flash memory devices; Digital VideoDisc (DVD's), EPROMs, EEPROMs, FLASH memory, magnetic or optical cards, or any type of media suitable for storing electronic instructions.

While some specific embodiments of the present invention have been shown the invention is not to be limited to these embodiments. For example, most functions performed by electronic hardware components may be duplicated by software emulation. Thus, a software program written to accomplish those same functions may emulate the functionality of the hardware components in input-output circuitry. The present invention is to be understood as not limited by the specific embodiments described herein, but only by scope of the appended claims.

The invention claimed is:

1. An online jury research system configured to assist end-users in building and tailoring surrogate jury surveys, comprising:
   a jury research server system comprising:
   a processor; and
   coupled to the processor, the memory including instructions configured to:
   i) generate a jury research system comprising a survey services package and an end-user interface wherein the survey services package comprises at least a questions pool, a respondents pool, a survey builder, and payment authorization service;
   wherein the end-user interface is configured to provide access to the survey services package data; and;
   wherein the respondents pool comprises a plurality of respondents that may be selected as surrogate jurors;
   the questions pool comprises:
      a plurality of questions in a pre-defined format, tailored for eliciting concise responses from selected surrogate jurors with respect to a pre-defined case type; and
      a plurality of questions in a format defined by the end-user configured to their specific case type;
   the payment authorization service comprises enabling the end-users to send payment via a secure infrastructure to an operator of the online jury research system, the payment being predetermined and uploaded by each of the end-users; and
   wherein the payment authorization service, is further configured to communicate a notification to a research provider when the predetermined payment is authorized, thereby allowing the end-users to build a surrogate jury survey;
   ii) communicate with a database server system comprising a non-transient machine-readable medium for storing data needed during the operation of the jury research system, and wherein the database server system and jury research system are coupled via a communication network; and
   iii) provide end-user access to a host site, the host site being stored on the memory of the jury research server system, and being configured to be accessible to end-users by way of a communications network, and provide end-users access to the jury research system interface;
   wherein the surrogate jury survey is generated upon the end-users signing up to receive research services from a research provider, the research services comprising a plurality of research packages; and
   wherein the jury research system:
      receives, via the survey builder, survey data including questions, videotaped opening or closing statements, depositions, exhibits, graphics, and other similar information uploaded by the end user;
      generates a plurality of surrogate juror surveys utilizing the received survey data;
      sends the plurality of surrogate juror surveys for testing to a respondents provider;
      processes any received problems from the respondents provider;
      receives a selected multiplicity of surrogate jurors;
      generates web site access to the plurality of surrogate juror surveys;
      provides a surrogate juror survey from the plurality of surrogate juror surveys to a multiplicity of the selected surrogate jurors via website access within their own private location;
      receives surrogate juror survey responses;
      notifies the respondents provider upon receiving a completed surrogate juror survey response;
      notifies the respondents provider upon receiving an incomplete surrogate juror survey response;
      queries, upon receipt of all surrogate juror survey responses, the received surrogate juror survey responses automatically;
      compiles the results of the surrogate juror survey for review by the end-users.

2. The online jury research system of claim 1, wherein the survey services package is stored on the memory of the jury research server system, and the interface is a software application comprising a portion of the jury research system.

3. The online jury research system of claim 1, wherein the survey services package is stored on the memory of the database server system, and the interface is configured to interact with the jury research server system and the survey services package.

4. The online jury research system of claim 1, wherein the interface comprises a connection over the communications network whereby the jury research server system may send requests to, and receive services from the one or more third-party service providers.

5. The online jury research system of claim 1, wherein the survey builder comprises at least one software application stored on the jury research server system, whereby the end-users interact with the survey builder by way of the host site.

6. The online jury research system of claim 1, wherein the survey builder comprises a third-party service provider which assists the end-users with building and tailoring surrogate jury surveys by way of the interface.

7. The online jury research system of claim 6, wherein the third-party service provider sends completed surrogate juror surveys to the jury research server system by way of the interface.

8. The online jury research system of claim 7, wherein the third-party service provider makes the surrogate juror survey accessible to the multiplicity of selected respondents and then sends final results of the surrogate juror survey to the jury research server system by way of the interface.

9. The online jury research system of claim 1, wherein the survey services package includes a respondents pool comprising a multiplicity of suitable surrogate jurors that are selected for providing answers to questions posed in surrogate jury surveys.

10. The online jury research system of claim 9, wherein the survey builder has access to the respondents pool so appropriate respondents for surrogate jury surveys may be selected.

11. The online jury research system of claim 10, wherein the respondents pool is stored on the database server system and is accessible to the survey builder by way of the interface.

12. The online jury research system of claim 10, wherein the respondents pool is provided and moderated by a third-party service provider which specializes in gathering panels of respondents that are suitable for surrogate jury surveys.

13. The online jury research system of claim 1, wherein the survey services package includes a questions pool comprising a group of compelling questions that are tested and well known to elicit concise responses from surrogate jurors.

14. The online jury research system of claim 13, wherein the questions pool is accessible to the survey builder, thereby enabling the end-users to select questions that are best suited to the type of surrogate jury survey being created.

15. The online jury research system of claim 13, wherein the end-user may create new questions in addition to, or in place of selecting questions from the question pool.

16. The online jury research system of claim 13, wherein the questions pool is stored on the database server system, and is accessible to the survey builder by way of the interface.

17. The online jury research system of claim 16, wherein the survey builder comprises a third-party service provider which has access to the questions pool that is stored on the database server system, and any questions created by the end-user, by way of the interface.

18. The online jury research system of claim 16, wherein the questions pool is stored with the survey builder and then transferred to the database server system by way of the interface after the surrogate jury survey is completed in the survey builder.

19. The online jury research system of claim 18, wherein the questions pool is retained by the survey builder and only final results of the surrogate jury survey are transferred to the jury research server system once the survey has been completed.

* * * * *